July 28, 1959 R. M. DRUMMOND 2,896,740
GAS WASHING APPARATUS
Filed May 26, 1958 4 Sheets-Sheet 1

INVENTOR
Roy MacGregor Drummond
BY
Norris & Bateman
ATTORNEY

July 28, 1959 R. M. DRUMMOND 2,896,740
GAS WASHING APPARATUS
Filed May 26, 1958 4 Sheets-Sheet 3

INVENTOR
Roy Macgregor Drummond
BY
Norris & Bateman
ATTORNEYS

July 28, 1959 R. M. DRUMMOND 2,896,740
GAS WASHING APPARATUS
Filed May 26, 1958 4 Sheets-Sheet 4

INVENTOR
Roy Macgregor Drummond
BY
Norris + Bateman
ATTORNEYS

United States Patent Office 2,896,740
Patented July 28, 1959

2,896,740

GAS WASHING APPARATUS

Roy Macgregor Drummond, Hove, England

Application May 26, 1958, Serial No. 737,914

8 Claims. (Cl. 183—3)

This invention relates to an improved gas washing apparatus and is a continuation-in-part of the invention of application Serial No. 494,146, now abandoned.

Gas washing apparatus is known in which gas to be washed is blown on to the surface of a wash liquid and passes under a baffle thereby producing a gas-liquid spray which is caused to impinge upon a surface whereby the gas and liquid are separated and impurity is taken out of the gas by the liquid. It is also known to produce a gas-liquid spray by blowing gas on to a liquid surface and passing the spray up the interior of an open vertical cylinder.

An object of the present invention is to provide a gas washing apparatus which is more efficient than known apparatus, from the point of view that a particular effect can be achieved with an apparatus of smaller size, or with an economy in total power for the same output.

This object is achieved with an apparatus in which inclined gas liquid sprays forcibly blown upwards from the surface of a wash liquid are caused to strike one another at a substantial angle. In this case the washing is more efficient than in the case of single extended sprays or single conical sprays originating substantially from one point or sprays which are merely confused and not positively directed one against another.

A further object of the invention is to provide means for removal of impurities from the wash liquid, with particular reference to deposit from the air extracted from paint spray booths, which means obviates the need for the use of settling tanks for the impure wash liquid and the necessary periodic cleaning thereof.

This further object is achieved by the provision in the wash liquid circuit of one or more screens adapted to retain the said impurities. Paint spray deposit can be removed from such screens as a coherent mass with very substantial saving in space and manpower.

Figure 1:
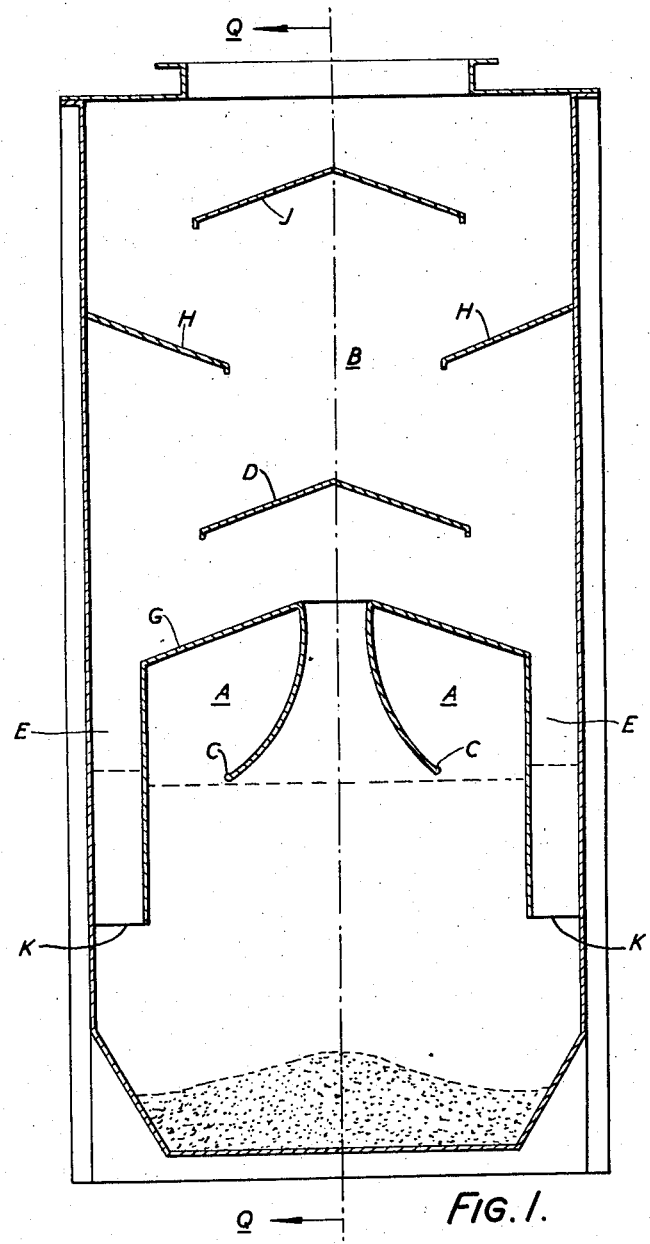
Figure 2:
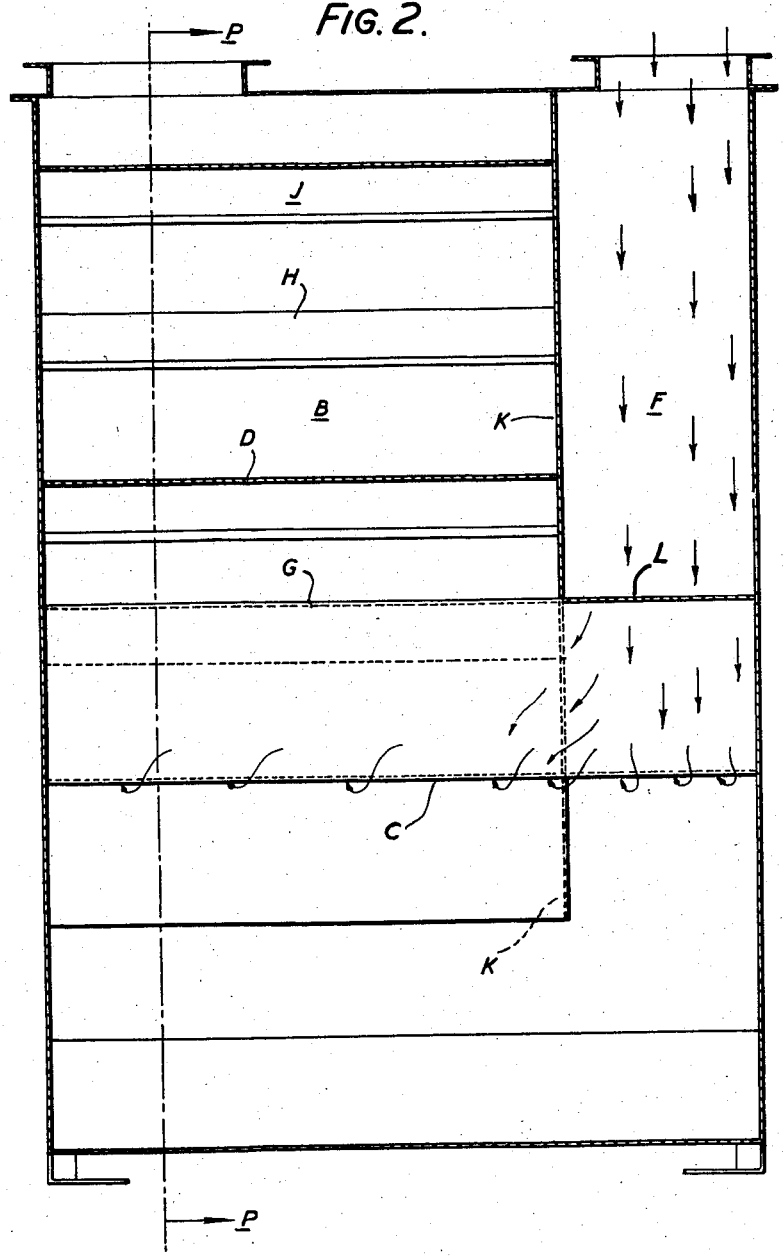
Figure 3:
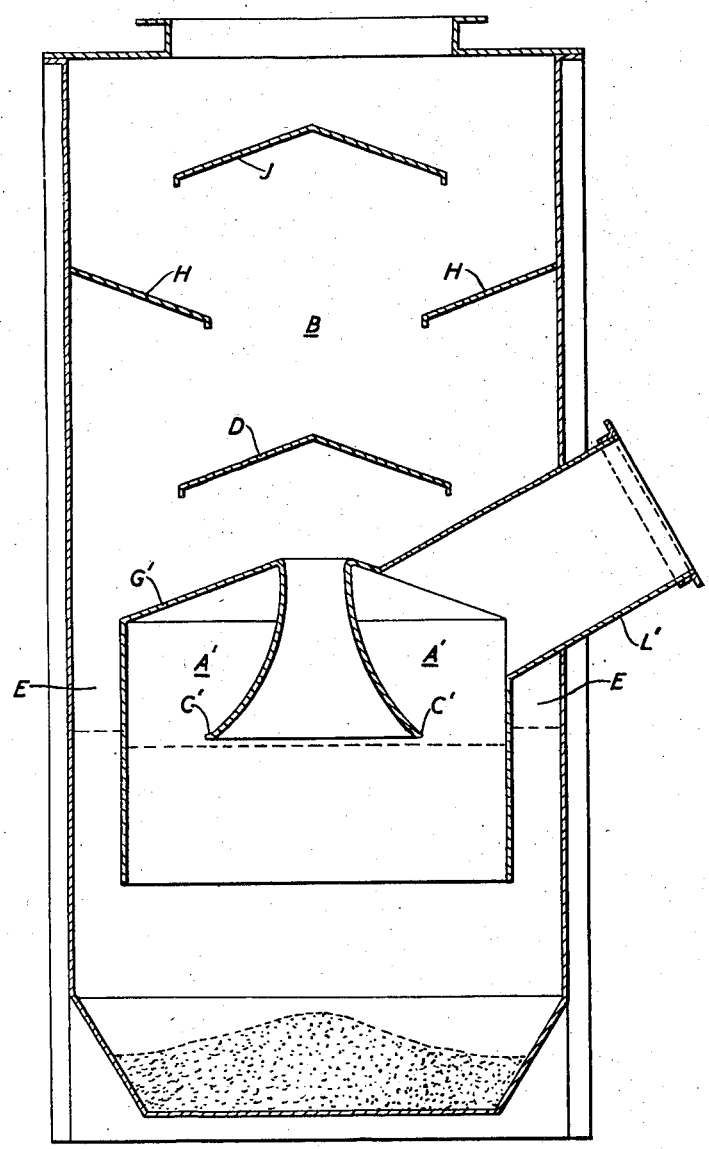
Figure 4:
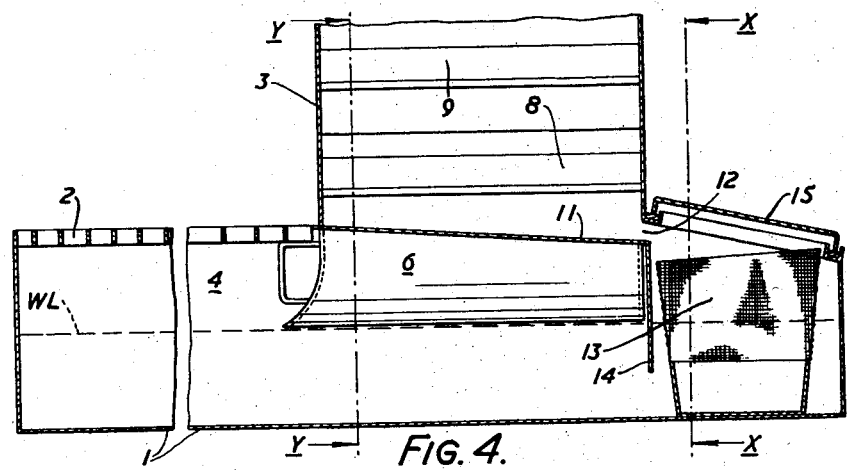
Figure 5:
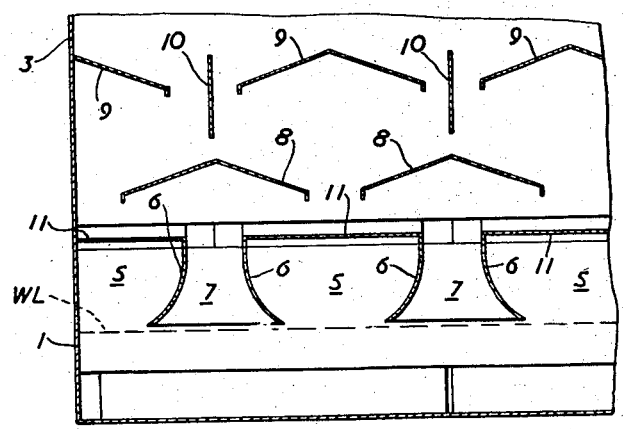
Figure 6:
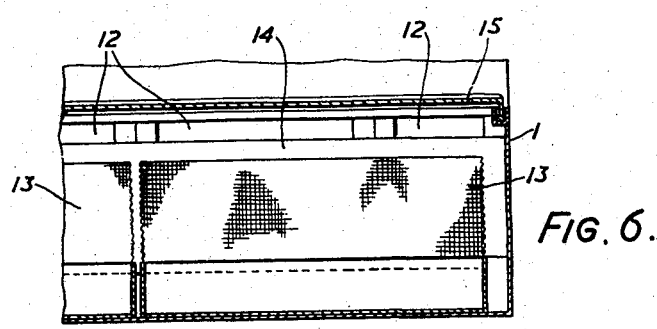

Several forms of construction of the apparatus of the invention are illustrated in the accompanying drawings in which:

Fig. 1 is a diagrammatic sectional elevation of one form of construction, taken in the line P—P of Fig. 2, Fig. 2 is a central vertical section on the line Q—Q of Fig. 1, Fig. 3 is a diagrammatic sectional elevation of a second form of construction, Fig. 4 is part of a sectional side elevation of an apparatus for purifying the air in a confined space such as a paint spray booth, Fig. 5 is part of a sectional front elevation on the line Y—Y of Fig. 4 and Fig. 6 is part of a sectional rear elevation on the line X—X of Fig. 4.

Figs. 1 and 2 of the drawings show a fluid-tight vessel which comprises an inlet chamber F into which gases to be purified are led under suction created in a larger chamber B of the vessel by means of a fan, not shown. B is separated from F by a vertical partition K. From F, the gases pass through a gap in the partition into spaces A within a shell G extending horizontally across the chamber B and supported by its outer casing and the partition. Flaring downwards from an upper longitudinal outlet opening of the shell are two curved baffles C round which the gases pass into the chamber B. As shown in Fig. 2, the curved baffles C extend across the chamber F in which they are roofed over at L. The lower part of the vessel is filled with washing liquid such as water to the level shown in Fig. 1. The passage of the gases under the baffles creates two opposed sprays of mixed gas and broken liquid between the baffles and along the length of the shell. The effect of the impingement of these sprays one against the other is to enhance the purification in the manner described above. The effect of the constriction of the sprays in an upward direction towards the upper opening of the shell is to form a jet which passes out of the shell and then impinges upon a central ridged impingement plate D which deflects the main body of the scrubbing liquid on to the outside of the shell from whence it runs down through channels E into the reservoir of liquid, thereby washing deposited solid material into a sump at the base. Gas and liquid escaping round the plate D meet echelon plates H extending inwards from the sides of the casing of the vessel and a further central ridged impingement plate J, which latter plates cause further deposition of liquid and impurity, the gas finally leaving through an outlet in the purified condition.

A single vessel casing may contain a plurality of parallel shells with pairs of opposed baffles so that the required working capacity can be provided.

In a further embodiment of the apparatus according to the invention shown in Fig. 3, the sides of the outer casing and the shell G' are cylindrical and instead of a pair of opposed baffles a single open topped bell-shaped baffle C' may be substituted. The space between the shell G' and baffle C' is represented by A'. The arrangement of impingement and echelon plates is then correspondingly modified. In this embodiment the inlet L' is shown at the side, the inlet channel being inclined downwards to the interior of the shell G'. A central vertical section of this apparatus at right angles to Fig. 3, looking to the left will appear very similar to Fig. 1.

Referring to Figs. 4–6 of the drawings, 1 is a reservoir with means not illustrated for maintaining a level of water at W.L. and 2 is a grating for the entry of impure air under suction by a fan, not illustrated, connected to the top of a shaft 3. The impure air first enters a space 4 in the reservoir from which it passes into spaces 5 between curved sweep plates or baffles 6 (see Fig. 5). From there it passes under the baffles 6 into spaces 7 in which opposed sprays of air and water are formed and meet in a central zone. The sprays impinge on a series of retarder impingement plates 8 which deflect the water downwards while the purified air passes round them to impinge on a second, higher, staggered series of retarder plates 9 with separator plates 10 between them. The return water containing impurities is collected on sloping ceiling plates 11 and flows downwards to the right of Fig. 1 through slotted orifices 12 in the shaft 3 into basket screens 13 in a rear compartment of the reservoir 1, which screens retain the solids in suspension while screened liquid is directed back into the main part of the reservoir 1. A seal plate 14 is integral with the ceiling plates 11 and confines the upwardly flowing air so that it does not disturb the lateral flow of water into the screens. Cover plates 15 are provided for ease of removal of the basket screens for emptying and replacement.

In all cases a device is provided for controlling the level of the washing liquid.

I claim:

1. Gas washing apparatus comprising a fluid tight vessel having an inlet for gas to be washed and an outlet for washed gas, partition means within the vessel providing a vertical chamber communicating with said outlet, means for providing a body of washing liquid within the lower end of said vessel below said chamber, said partition means also including a transverse portion extending at least across said chamber above the surface of said liquid, means providing an opening in said transverse partition portion, means defining an inlet passage from said inlet through said partition means into the space between said transverse partition portion and the liquid surface, downwardly open baffle means rigid with said transverse partition portion flaring outwardly and downwardly from said opening extending into said space and terminating in horizontal edge structure disposed at about the level of said liquid surface, said horizontal edge structure being so constructed and arranged that at least one portion of the horizontal edge structure is opposed, with respect to a vertical plane through the opening, to another portion of said horizontal edge structure, and means providing at least one impingement surface within said chamber above said opening, so that when said outlet is at reduced fluid pressure with respect to said inlet the gas to be washed enters said space below said transverse partition portion and passes over said horizontal edge structure and through the converging baffle means to discharge through said opening against said impingement surface where gas and liquid separation is effected, the gas rising further in the chamber toward the outlet and liquid containing material to be washed out separating therefrom, the relative locations of said horizontal edge structure and said liquid surface being such that gas passing over said opposed edge portions results in upward oppositely angularly related gas-liquid sprays that forcibly intermingle within the baffle means mainly below said opening.

2. In the gas washing apparatus defined in claim 1, said partition means having lower edges terminating above the bottom of said vessel and said body of washing liquid having its upper surface disposed above said lower partition edges.

3. In the gas washing apparatus defined in claim 2, said body of washing liquid extending outwardly beyond said partition means edges and disposed to receive the separated liquid dropping from said impingement surface.

4. Gas washing apparatus as defined in claim 1, wherein said transverse partition portion comprises the top of a shell extending across the chamber, said opening is elongated and formed in said shell top, and said baffle means comprises a pair of baffle members extending down from opposite sides of said opening.

5. Gas washing apparatus as defined in claim 1, wherein said partition means comprises a cylindrical shell defining the lower end of said chamber, said transverse partition portion extends across said shell, said opening is concentric with said cylinder, and said baffle means is an outwardly flared hollow annular member substantially symmetrical about said opening.

6. Gas washing apparatus as defined in claim 1, wherein the inlet and outlet are both at the top of said vessel, said partition means includes a vertical portion that defines said vertical chamber and separates it from a vertical inlet passage leading from said inlet, and said vertical partition portion being apertured to allow passage of incoming gas to be washed into said space above the liquid surface.

7. Gas washing apparatus comprising a fluid tight vessel having an inlet for gas to be washed and an outlet for washed gas, means within the vessel providing a chamber communicating with said outlet, means for providing a body of washing liquid within the lower end of said vessel below said chamber, partition means including a transverse portion extending at least partly across said chamber above the surface of said liquid, means providing an opening in said transverse partition portion, means defining an inlet passage from said inlet into the space between said transverse partition portion and the liquid surface, downwardly open baffle means rigid with said transverse partition portion flaring outwardly and downwardly from said opening extending into said space and terminating in horizontal edge structure disposed at about the level of said liquid surface, said horizontal edge structure being so constructed and arranged that at least one portion of the horizontal edge structure is opposed, with respect to a vertical plane through the opening, to another portion of said horizontal edge structure, and means providing at least one impingement surface within said chamber above said opening, so that when said outlet is at reduced fluid pressure with respect to said inlet the gas to be washed enters said space below said transverse partition portion and passes over said horizontal edge structure and through the converging baffle means to discharge through said opening against said impingement surface where gas and liquid separation is effected, the gas rising further in the chamber toward the outlet and liquid containing material to be washed out separating therefrom, the relative locations of said horizontal edge structure and said liquid surface being such that gas passing over said opposed edge portions results in upward oppositely angularly related gas-liquid sprays that forcibly intermingle within the baffle means mainly below said opening.

8. Gas washing apparatus as defined in claim 7, having within said fluid tight vessel, in the washing liquid circuit between the impingement surface and the horizontal edge structure, screening means for removal of undissolved impurities from said washing liquid, means for directing impure washing liquid separated from gas to the screening means and means for returning screened washing liquid to the main body of washing liquid, detachable fluid tight cover means being provided in said fluid tight vessel through which cover means the screening means is accessible from the exterior for cleaning.

References Cited in the file of this patent

UNITED STATES PATENTS

| | | |
|---|---|---|
| 2,120,490 | Drummond | June 14, 1938 |
| 2,380,065 | Newcomb | July 10, 1945 |